United States Patent Office.

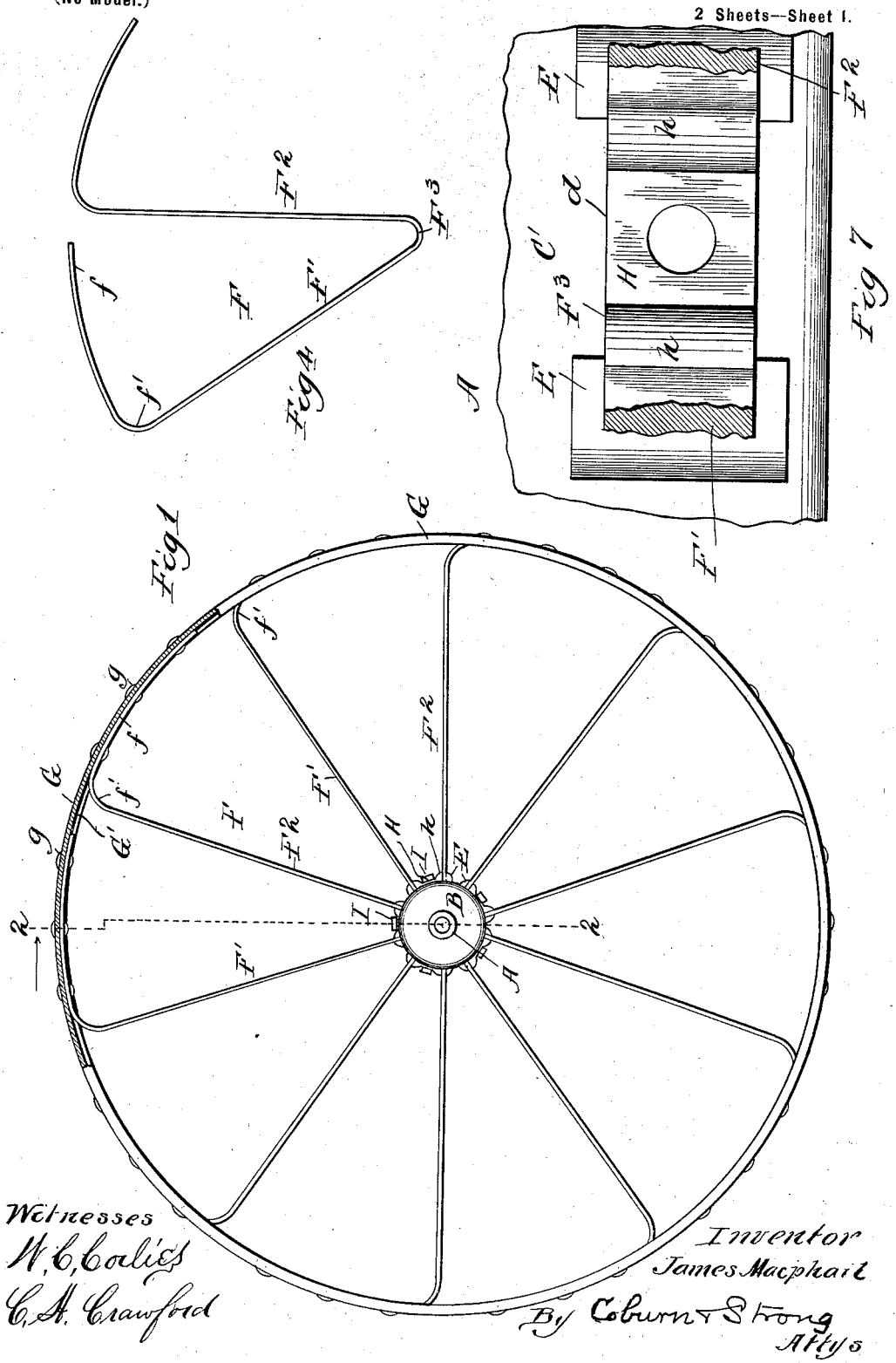

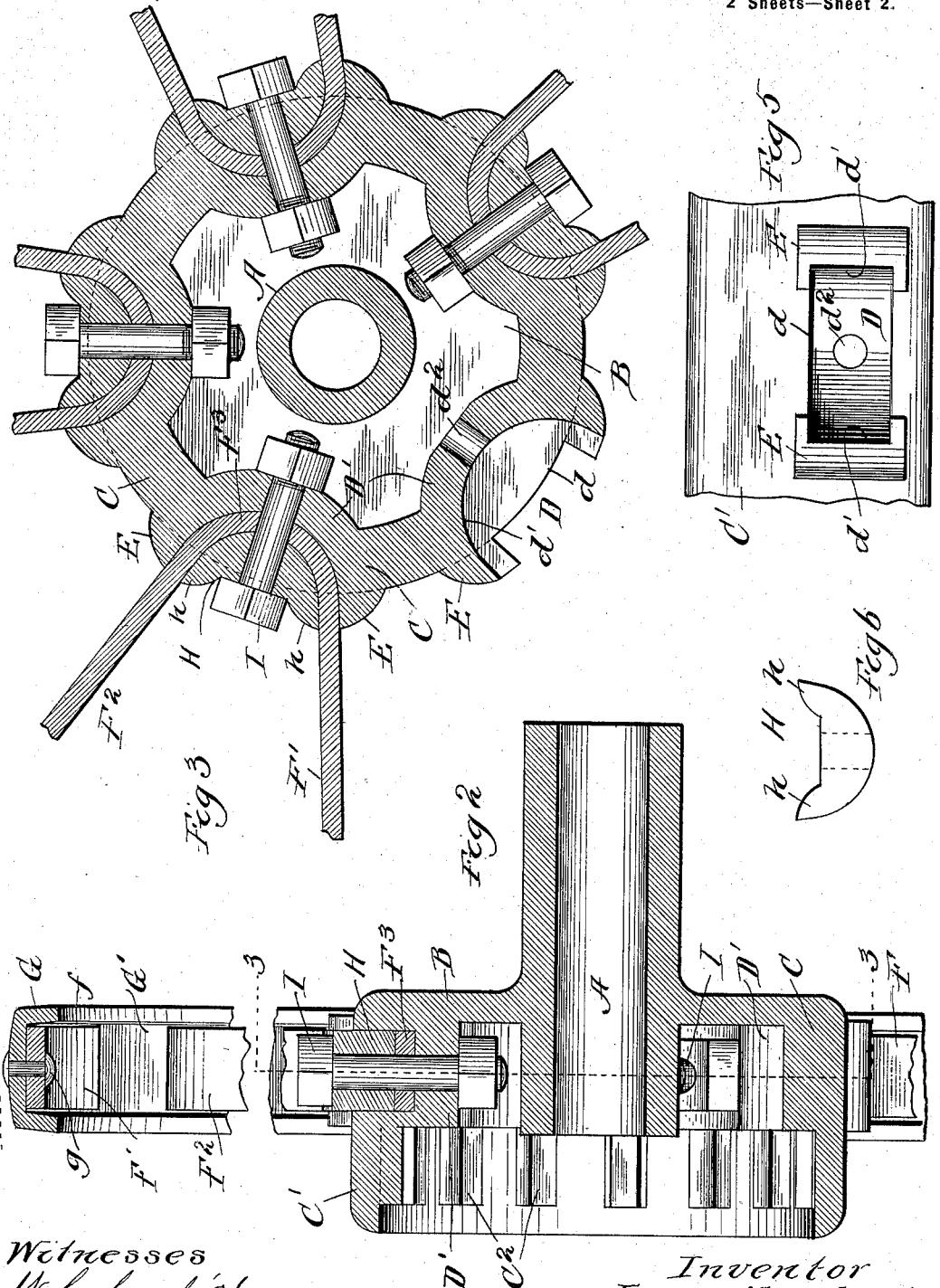

JAMES MACPHAIL, OF WEST PULLMAN, ILLINOIS, ASSIGNOR TO THE PLANO MANUFACTURING COMPANY, OF CHICAGO, ILLINOIS.

WHEEL.

SPECIFICATION forming part of Letters Patent No. 609,203, dated August 16, 1898.

Application filed August 10, 1896. Serial No. 602,238. (No model.)

*To all whom it may concern:*

Be it known that I, JAMES MACPHAIL, a citizen of the United States, residing at West Pullman, in the county of Cook and State of Illinois, have invented a certain new and useful Improvement in Wheels, which is fully set forth in the following specification, reference being had to the accompanying drawings, in which—

Figure 1 is a side elevation of a wheel constructed according to my invention, with a portion thereof shown in vertical section. Fig. 2 is a vertical cross-section on the line 2 2 of Fig. 1, on an enlarged scale, with parts broken away. Fig. 3 is a vertical longitudinal section of the hub and parts thereto attached, on the line 3 3 of Fig. 2. Fig. 4 is an elevation of a spoke. Fig. 5 is a plan view of the outer surface of a portion of the hub. Fig. 6 is a detail view of one of the clamping-plugs. Fig. 7 is a plan view of a portion of the hub and a spoke and of a clamping-plug arranged in place.

My invention relates to wheels, particularly to such as are used in hay-rakes and other like agricultural implements. It has for its object to provide a wheel of this type more economical in construction and more cheaply and easily repaired than the wheels previously used.

It has for a further object to render such a wheel less subject to breakage or indentation by a spoke construction which makes the connection between the rim and the hub a more or less elastic one, as will be hereinafter described.

Referring to the drawings by letter, A represents the hub proper, which is adapted to be mounted upon the axle of the machine. The said hub A near its inner end is provided with an upright flange B, preferably formed integral with the said hub. Upon the outer edge of the flange B is formed a second and inwardly-extending flange C, at right angles to the said flange B, and thus concentric with the hub proper, A. This flange C may be further extended inward and be provided with teeth $C^2$ on its inner surface, thus forming an internal gear where such is necessary for the operation of the machine in question.

Entering into the flange C from the outer surface thereof are formed a series of semi-cylindrical recesses D. The side walls of each, $d$, are vertical. The bottoms of each, $d'$, are curved, as shown. In order to make these recesses of sufficient depth without unduly increasing the thickness of the flange C, the said flange may be formed to curve inward toward the hub, as at $D'$. At the bottom of each recess D a bolt-hole $d^2$ extends through the flange C. In practice I find it desirable also to form on each side of the recess D a lug or projection E, which are so disposed that by the recess D the said lugs are also partly cut away, as particularly shown in Figs. 3 and 5. All of the parts hereinabove described may be made integral in a single casting.

The spoke employed is in general of the type known as "hair-pin spokes"—that is, the double spoke F comprises the two spokes $F'$ and $F^2$, united at their hub ends by the bend or loop $F^3$. The said bend $F^3$ is perforated to permit of its being bolted to the hub, as hereinafter described. Upon each outer end of the double spoke is formed a segmental extension $f$, concentric with the rim of the wheel and united with the body of the spoke by the bend $f'$. These spokes are preferably made of flat bar-iron, which is easily struck up into the requisite form.

The tire G is preferably formed with a channel $G'$ upon its inner surface of such shape and width as to be adapted to receive the segmental extensions $f$ of the spokes, which may be secured to the said tire by the bolts or rivets $g$.

The clamping-plugs H are each made in the form of a segment of a cylinder. They may be further provided with the lugs $h$ in case the corresponding lugs E upon the hub-flange are used. The clamping-plug is perforated to permit of the insertion of the bolt I, later described.

When the wheel is to be set up, each spoke-loop $F^3$ is inserted in one of the recesses D, in which it is adapted to fit snugly. The clamping-plug H is next put in place within the loop of the said spoke, each clamping-plug being drawn tightly into place by the bolt I. The spoke is thus securely fastened to the hub. The function of the lugs E upon the hub-flange C and of the corresponding lugs h upon the clamping-plugs is to provide the loop of the spoke with a longer bearing than it would otherwise have without unduly increasing the thickness of the flange C.

The segmental extensions upon the rim ends of the spokes are then secured in place in the channeled surface of the wheel-rim by the rivets g. The bends f' thus provide an elastic connection between the wheel-rim and the hub. The rim yields to a certain extent when striking some obstruction instead of becoming indented or of breaking. It will further be seen by the entirely separate connection of each double spoke with the hub and with the rim that upon the breakage of one of such spokes the same can be easily removed and another substituted without taking apart the entire wheel, which has hitherto been necessary in wheels formed with "hair-pin spokes."

Having thus described my invention, I do not wish to limit the same to the details of construction herein shown and described; but

What I claim, and desire to secure by Letters Patent, is—

1. In a wheel, the hub A; the flange C concentric with the hub and provided with the segmental recesses D; the flat double spokes F, comprising the two spokes F' and F² united at their hub ends by the loop F³; the said loops F³ being adapted to fit in the said recesses D; segmental clamping-plugs H adapted to fit within the loops F³; bolts I passing through the said plugs H, loops F³ and flange C; the rim G; and means for attaching the rim ends of the spokes thereto.

2. In a wheel, the integral spokes F, comprising the two spokes F' and F² united at their hub ends by the segmental loop F³ and terminating with the segmental extensions f connected to the said spokes by the bends or loops f'; with the hub A comprising the flange C containing the segmental recesses D coöperating with the segmental loops F³ together with the segmental plugs H and the bolts I; and the tire G having the internal flanges and connected to said extensions f, substantially as shown and described.

JAMES MACPHAIL.

Witnesses:
A. A. MURRAY,
FLORA BROM.